Patented May 18, 1943

2,319,386

UNITED STATES PATENT OFFICE 2,319,386

METHOD OF MAKING PHENOLATED RESINS

William H. Carmody and Harold E. Kelly, Springfield, Ohio, assignors to Carmody Research Laboratories, Inc., a corporation of Ohio No Drawing. Application February 10, 1940, Serial No. 318,322

2 Claims. (Cl. 260—62)

The present invention relates to the production of chemically modified resins of polymeric nature, and more especially concerns the production of terpene polymers, resins and oils of the nature and structure described and claimed in a copending application of William H. Carmody, Serial No. 139,739, filed April 29, 1937, chemically treated to phenolate the same. The invention involves both procedure for producing such chemically modified resins and the new and useful compounds resulting from that procedure.

Hydrocarbon resins in general and resins and oils composed essentially of terpene polymers in particular have the inherent disadvantage of being incompatible with ethyl cellulose and certain other solvents. This is especially true in connection with pinene polymers made with the use of aluminum chloride as a catalyst. Incompatibility, as the term is herein used, means the impossibility of producing a clear film or solution of resin and ethyl cellulose free from cloudiness or haziness. This is frequently a disadvantage not only in the production of cellulosic protective and other films but also in connection with paints, varnishes, lacquers and the like. Compatibility, as used herein, consequently denotes the capacity for the formation of a perfectly clear film or solution, e. g., of the nature of cellophane, the presence of even the slightest cloudiness or haziness being deemed sufficient to classify or constitute the resin as incompatible.

Upon the discovery of the incompatibility of pinene polymers and resins and oils composed essentially of polymerized terpenes having the structure and properties set forth in the above identified Carmody application, attempts were made to overcome this difficulty. Physical modification of the resins and oils, although explored, proved to be of no avail.

This invention is based upon the discovery that this incompatibility can be overcome by chemical modification of the resins and oils, and in particular by that chemical modification which involves phenolation, within the scope of which is included both phenol itself and its homologues, such constituting a primary object of the invention.

Another object of the invention resides in producing phenolated terpene polymers and hydrocarbon resins which are not of a wholly hydrocarbon nature chemically or structurally.

A further object of the invention resides in a procedure for introducing one or more phenol radicals (or homologues of phenol) into an otherwise wholly hydrocarbon polymeric resin of straight chain structure and which has a single double bond unsaturation in its terminal unit.

A still further object of the invention resides in a procedure for producing compatible hydrocarbon resins from terpene resins both during and subsequent to formation of such terpene resins.

A still further object of the invention resides in the compatible terpenic resins produced by the phenolation of unsaturated terpene polymers either with phenol or with a homologue of phenol.

Still another object of the invention resides in phenolated terpenic polymers (resins and oils) which have new and useful properties and characteristics atypical of terpene resins.

Still a further object of the invention consists in the formation of hydrocarbon polymeric resins of straight chain structure the normal unsaturation of the terminal unit of which has been utilized to cause phenol or one of its homologues to combine therewith.

Fundamentally, the present invention is based upon the discovery, supported by experimental proof, that incompatibility is a structural or molecular characteristic and not merely a physical property of the resin involved. As pointed out in the aforesaid Carmody application, terpene polymers are composed of straight chain combinations of the fundamental terpene chemical unit graphically designated by the formula $C_{10}H_{16}$. The terpene polymers range, as explained in that application, from the monomer or isomer, which is purely a structural rearrangement of a single $C_{10}H_{16}$ unit, through the regular progressive polymers $(C_{10}H_{16})_2$, $(C_{10}H_{16})_3$, etc. up to and including $(C_{10}H_{16})_x$, which is commonly and will hereinafter be used as the generic polymer designation. High molecular weight polymers and the true resins of polymeric nature may involve a considerable number of these $C_{10}H_{16}$ units. For the purposes of brevity and convenience, these high molecular weight compounds will hereinafter be referred to as resins.

Unhydrogenated terpene polymers have been shown to consist of a series of terpene units arranged in linear fashion in a straight line or chain and having residual unsaturation (one double bond) only in the terminal unit thereof. As explained in Carmody application Serial No. 280,128, filed June 20, 1939, these terminal units are capable of considerable reactivity, hydrogen entering readily at the double bond under proper conditions to produce a saturated compound. Both the saturated and unsaturated polymers and resins are wholly hydrocarbon in nature, being composed solely and entirely of the elements carbon and hydrogen which are chiefly present as $C_{10}H_{16}$ units. As such, these compounds contain no oxygen and this, we are convinced, is at least one of the significant reasons why the compounds are incompatible with many oxygen-containing liquids or solvents. To this generality there are some exceptions. The incompatibility referred to is particularly apparent and especially objectionable relative to solid materials of cellulosic nature which contain many oxy-groups. Terpene polymers and cellulosic solids are well known to be incompatible as the same produce cloudy films when both are simultaneously deposited from solutions.

Research and experimentation in accordance with this invention have demonstrated that phenol and the tar acids in general overcome the incompatibility above mentioned and a plausible explanation may be based on the fact that the phenols and tar acids themselves contain oxygen and they, therefore, introduce oxygen into the resins and polymers when phenolation occurs.

The introduction of oxygen during phenolation in accordance with this invention is in the form of a phenolic hydroxyl group. The compatabilizing action of phenol is due specifically thereto. The presence of the oxygen as a constituent or inner part of the OH group is also of significance. This phenolic hydroxyl group is the most desired form of a compatibilizing agent.

The phenolation occurs at the double bond in the terminal resin unit of these straight chain terpene polymers and in this respect is chemically analogous to hydrogenation in that the hitherto unsaturated terpene resins become saturated with phenol (or with a homologous radical) in much the same manner as hydrogenation causes saturation as set forth in considerable detail in application No. 280,128 above mentioned. The amount of tar acid, i. e., the number of phenol or other groups, is in the proportion of one mole of resin to one mole of tar acid, and this is additional evidence indicating that the phenolation occurs at the double bond in a manner similar to that of hydrogenation. The molecular weight of the polymer or resin has the effect of weighting the same, i. e., there is a definite increase in molecular weight which is reflected by a raised melting point. In some instances the melting point is increased as much as 10 to 12° C. In other instances, the increase has been less but still definite and appreciable.

As already pointed out, the invention comprises the introduction of phenol or other tar acid including cresols, xylenols, ethyl phenol, butyl phenol and amyl phenols; i. e., phenol or a homologue thereof. We have, however, further discovered that the lower the homologue the greater the value, at least from a theoretical point of view, due in part to economic factors involved in the increased scarcity and greater cost of the higher homologues as well as the somewhat increased difficulty of introducing the same into resins and polymers. We, therefore, are convinced that phenol itself, i. e., carbolic acid ($C_6H_5OH$) is the most important commercially and economically, although the higher homologues are operative in and are deemed to form a definite part of this invention. In the further discussion of the invention, particularly as regards procedure for introducing tar acid into resins and polymers, we shall describe the details of the invention with specific reference to phenol with the understanding that this is for convenience and exemplary purposes only, with no intention of limiting the invention thereto.

For example, chemically speaking, phenol can be introduced into a terpene resin or polymer comparatively simply and at a low temperature with only a relatively small amount of catalyst, whereas cresol can only be introduced at higher temperatures and under such conditions that a certain amount of depolymerization or deresinification cannot be avoided, with a consequent depression in melting point. These and other matters will be more fully understood from what follows.

In introducing phenol into a terpene resin or polymer there is first formed, in accordance with the general rule applicable to such cases, an intermediate ether type compound which subsequently becomes stereoisometrically rearranged to a phenol type compound which, while somewhat resembling the original and having the same percentage formula, is none the less chemically distinct therefrom. The following type reactions graphically represent the above changes and will consequently aid the chemist in an understanding thereof:

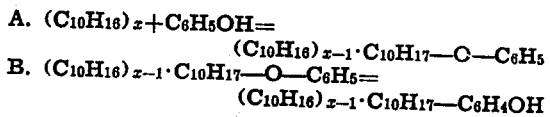

A. $(C_{10}H_{16})_x + C_6H_5OH =$
$(C_{10}H_{16})_{x-1} \cdot C_{10}H_{17} - O - C_6H_5$ B. $(C_{10}H_{16})_{x-1} \cdot C_{10}H_{17} - O - C_6H_5 =$
$(C_{10}H_{16})_{x-1} \cdot C_{10}H_{17} - C_6H_4OH$ Since the general type formula for ethers is R—O—R', it will be observed that the intermediate product, i. e., the product produced from the first reaction, is of such character. As the reaction becomes completed, a displacement of the oxygen forming the connecting link between the phenolic and resinous groups occurs which expels the same to an outermost position, resulting in a resumption of the role of a phenol oxygen. The end product, which is the product produced by the second reaction, is considerably more stable than the intermediate product resulting from the first reaction and is representative of the ultimate polymer or resin formed in accordance with this invention, it being understood that for lesser degrees of polymerization the subscript $x$ would be replaced by a finite number in accordance with the actual number of terpene units existing in any given polymer. It will therefore be noted that the product herein produced and forming a part of the present invention is a terpene resin modified by inter-reaction with a phenolic body in such manner that there is produced an oxygen-containing resin partaking of the structure of both an ether and a phenol.

The phenolation may be carried out either substantially simultaneously with the formation of the resin or polymer or subsequent thereto. The phenolation occurring substantially simultaneously with polymerization generally produces a somewhat lesser yield of the final end product, together with a somewhat depressed melting point. This is probably due, at least in part, to the fact that phenols have an inhibiting or suppressing influence which accordingly retards polymerization and, therefore, has the effect of lessening the mean extent of polymerization in a given reaction. When aluminum chloride is used as the polymerizing catalyst, there are consequently two opposing tendencies operating at the same time. Therefore, in the presence of both aluminum chloride and phenol the net effect is somewhat of a compromise between the building up action of polymerization and the tearing down action of depolymerization. This is further complicated by the fact that even when both agents are present phenol can nevertheless be definitely introduced into the polymers as rapidly as they are formed, but, when introduced, result in saturation of the resin or polymer and, therefore, the further growth or polymerization of that particular compound is terminated. Thus, all polymer building must occur prior to phenolation in actual fact, although the two can take place practically contemporaneously or in such rapid succession as for all practical purposes to constitute a substantially simultaneous pair of reactions. These points will enable those skilled in the art to appreciate that there must be a nicety of balance among the various factors involved in the polymerizing and phenolating actions. In addition, these conditions tend to limit the production of the higher phenolated polymers which are commercially the most useful and for which the greatest demand exists.

Thus, while what we have termed substantially simultaneous polymerization and phenolation constitute a part of the present invention, actually we prefer to carry out phenolation subsequent to polymerization. It will be interesting, however, to set out the salient facts concerning actual runs involving the one step double reaction just described.

EXPERIMENT #1

Reaction mixture

|  | Grams |
|---|---|
| Pinene | 200 |
| Petroleum benzine | 200 |
| Solvent naphtha | 100 |
| Phenol | 50 |

To this mixture there was added with good cooling and stirring 12 grams of AlCl₃ on the following schedule:

| Time | Temp. | AlCl₃ |
|---|---|---|
| 10:15 | 16 | 3.1 |
| 10:18 | 21 | 4.5 |
| 10:22 | 21 | 5.3 |
| 10:26 | 18 | 7.2 |
| 10:30 | 21 | 8.9 |
| 10:35 | 22 | 11.4 |
| 10:40 | 27 | 12.0 |

When all the catalyst had been added, the mixture was warmed to 70–80° C. for an hour to ensure maximum yield. There was then added 10 grams more of AlCl₃, and the mixture further warmed for another hour until the evolution of HCl stopped. There is no evolution of HCl gas at the lower temperatures of polymerization. The catalyst was removed, and the solvents distilled off to obtain the resin. It weighed 142.9 grams, and considering both pinene and phenol as reactants, amounted to about 57%. It had a melting point of 82° C. and was compatible with ethyl cellulose.

During the first hour of the polymerizing reaction, there was not much resin formation as indicated by the lack of viscosity of the mixture and the small temperature rise when the catalyst was added. After the second catalyst addition, and prolonged higher heating, the mixture became thicker, and fumes of HCl were split out. The color of the resulting resin was dark. This darkness always accompanies the use of excess catalyst and the overheating of the resin mixture containing it.

Experiment No. 2 which follows further discloses that polymerization and phenolation can be carried out substantially simultaneously, but in this particular experiment activated clay was employed as a catalyst in lieu of aluminum chloride as in Experiment No. 3, supra. The essential features of the experiment follow:

EXPERIMENT #2

200 cc. pinene, 50 cc. cresol, and 15 grams of Super Filtrol, trade name for activated clay, were mixed and slowly warmed on the hotplate. Near 50° C. it was removed from the heat, when evidence of the reaction beginning was noted; the temperature continued to rise, the clay turned a reddish color, the contents foamed due to liberation of moisture from the clay, the last temperature read was 70° before a violent reaction occurred. The clay was filtered out and the resin solution was distilled. A very soft resin was obtained which was compatible with ethyl cellulose. It was soluble in alcohol and hydrocarbon solvents. On cooling it clouded very slightly but did not deposit resin. The heavy steam distillate obtained (probably cresylated pinene dimer) was also compatible with ethyl cellulose and was soluble in ethyl alcohol.

Experiments No. 1 and No. 2, although early ones prior to perfection of technique, definitely indicate that compatibility can be conferred upon a resin by at least two different catalysts. While these two experiments were not carried out under ideal conditions and while they preceded subsequently acquired knowledge of the inventions herein disclosed, they nevertheless reveal the discovery and reduction to practice of the phenolation of resins for purposes of endowing those resins with compatibility, particularly in connection with ethyl cellulose. As will be apparent hereinafter, better percentage yields, higher melting points and improved color were produced in the phenolated resins in accordance with later runs.

As we have previously set forth, we prefer to carry out the phenolation subsequent to polymerization. In point of time, the steps involved may be be carried out either relatively close together or relatively far apart. Not only does this make it possible to carry out phenolation as and when desired irrespective of the time of polymerization, but this makes it possible further to phenolate polymers and resins hitherto produced and regardless of manner of production and even though these products were produced prior to discovery of the present invention.

This ability to phenolate at a time independent of the time of polymerization has a further and unexpected advantage and value in that the polymerizing reaction can be carried out under conditions which favor polymerization either as to particular polymers produced or as to the yield, melting point and color of the polymers or resins. This is particularly important from a commercial point of view in view of the fact that, as we have already pointed out, polymerization and phenolation are mutually inhibitive, i. e., there are inconsistent tendencies at work which at one and the same time tend to build up and break down the desired polymers and resins. It is therefore to be appreciated that the polymerization may be carried out in any desirable or known manner to produce the desired or required results and that the separation of the polymerization and phenolation steps eliminates the antagonistic reactions from the sphere of each other's influence. We therefore prefer to carry out the present invention by that procedure which involves phenolation subsequent to the completion of the polymerization, but it is to be understood that we desire to place no limitation upon the lapse of time which may occur between these two steps of our procedure, the phenolation being equally well carried out immediately following the completion of polymerization or at a relatively remote time with respect thereto.

Experiment No. 3 which follows is illustrative of the procedure above discussed, namely, phenolation subsequent to the completion of polymerization, the essential features of the experiment being as follows:

EXPERIMENT #3

| | |
|---|---|
| A special terpene cut [1] | grams__ 200 |
| Benzol | cc__ 150 |
| $AlCl_3$ | grams__ 10 |

[1] Special cut had the following properties:

| | | | |
|---|---|---|---|
| IB | 155 | 70 | 160 |
| 5 | 158 | 80 | 160 |
| 10 | 158 | 90 | 161 |
| 20 | 158 | 95 | 165 |
| 30 | 159 | Dry | 171 |
| 40 | 159 | 98% distilled. | |
| 50 | 159 | S. G. at 20° 0.868. | |

This special cut was made from the highest boiling portions found in commercial gum turpentine, and is believed to be betapinene. Polymerized by itself, with no afterwarming, and no phenolating the yield from 200 grams is 183 grams, with a M. P. of only 122° C.

*First step: polymerization*

| Time | Temp. | $AlCl_3$ |
|---|---|---|
| 8:31 | 23 | 1.9 |
| 8:36 | 27 | 2.9 |
| 8:41 | 28 | 4.4 |
| 8:46 | 31 | 5.5 |
| 8:50 | 28 | 6.7 |
| 8:53 | 32 | 8.6 |
| 8:57 | 32 | 10.0 |
| 10:15 | Began 2nd step | |

*Second step: introduction of phenol*

The mixture was removed from the polymerizer, placed in a flask under a reflux condenser, and warmed for a very short time. The presence of benzol, with a boiling point of 80° C., held the temperature close to this value. 75 grams of phenol was added, and then 25 grams of additional $AlCl_3$ were added in very small portions, while the mixture was warm. With each addition, clouds of HCl gas were evolved. This evolution is proportional to the entry of phenol into the polymers. The mixture was simmered for an additional two hours, or until all gas evolution had stopped. The catalyst was washed out with 5–10% aqueous HCl; the solution distilled and the resin recovered.

*Resin characteristics*

Compatible with ethyl cellulose.
About ⅜ to ½ color.
Melting point of 139° C. by the ball and ring method, which equals 169° C. by the cube in mercury method.
Yield of 218 grams.

It will be noted that in Experiment No. 3, just above, phenol itself ($C_6H_5OH$) was employed as the phenolating agent, it being appreciated from what has preceded that within the meaning of the term "phenolation" we include not only phenol but the various homologues of phenol. We have previously also set forth that phenol is preferable to its homologues for commercial and chemical reasons, although the homologues are deemed to be, and are hereby made, a part of this invention, being operative although to a different extent and under more drastic conditions chemically. In support of the foregoing, reference is had to Experiment No. 4 which follows and which was identical with Experiment No. 3 except that cresol was employed in place of phenol.

EXPERIMENT #4

Reaction mixture same as #3.
Polymerizing schedule same as #3.
Second step carried out as in #3, with cresol.
The resulting resin had a B. & R. M. P. of 132°.
Yield was 212 grams of resin.
It was not compatible with ethyl cellulose.

Comparing these two experiments shows that the introduction of phenol in the first experiment amounted to close to 35 grams on an increased weight basis.

In the second experiment the cresol entry amounted to about 29 grams on the same basis.

In Experiments 3 and 4, phenolation was carried out promptly succeeding the completion of the polymerization, but, as we have above pointed out, this is not to be construed as a limitation upon our invention since the phenolation may occur as a relatively remote step. For example, already produced terpene resins which are, as produced, incompatible with ethyl cellulose can be rendered compatible in accordance with the present invention. The time or manner of production of these terpene resins is entirely immaterial per se. In converting these already manufactured incompatible resins to compatible resins or in ensuring the compatibility of terpene resins made without regard to their compatibility, we first put these resins back into solution by dissolving them in a suitable solvent and then in causing them to react with phenol or a homologue thereof in the presence of aluminum chloride as a catalyst. There is a further and important advantage accruing from this form of the procedure responding to our invention which is based on the fact that during production of these terpene resins they are freed from the lower polymers below the stage of resinification and are, in particular, free from dimers, i. e., dipolymers. In phenolating these purer resins and in view of the fact that phenolation is in some respects at least analogous to hydrogenation, it becomes apparent that the entire phenol content, or substantially the entire phenol content, is rendered available for combination with the higher resin polymers rather than with the relatively more unsaturated lower polymers which would ordinarily use up a material proportion of the phenolic body. Since it is the higher polymers, such as the resins, which have greater need for being compatibilized, this constitutes a further and additional advantage from the phenolation of previously completed solid terpene resins. Experiments Nos. 5 and 6, which follow, illustrate typical results produced when incompatible resins are compatibilized subsequent to formation by polymerization but not immediately afterwards. These runs also demonstrate the influence of the particular solvent employed.

EXPERIMENT #5

| | |
|---|---|
| Pinene resin | grams__ 50 |
| Phenol | do____ 20 |
| Benzol | cc__ 15 |
| $AlCl_3$ | grams__ 6 |

The AlCl₃ was added in smaller increments to the balance of the above ingredients, in a flask, and refluxed for ½ hour. Catalyst was removed and the resin recovered. The resin was compatible, and had a M. P. of 137° B. & R., while the original pinene resin had a M. P. of 125° B. & R. Color less than ⅜.

EXPERIMENT #6

| | |
|---|---|
| Pinene resin | grams 275 |
| Phenol | do 100 |
| Toluol | cc 75 |
| AlCl₃ | grams 25 |

Procedure same as in #5.

The resin had a M. P. of 120° B. & R., and was darker.

The refluxing temperature in B was higher than in A, due to the use of toluol which has a higher boiling point. The resin produced in A was somewhat higher grade than that produced by B.

In connection with the matter of catalysts, most of the foregoing experiments utilize aluminum chloride, since such forms a very effective and economical catalyst. In at least one Experiment (#2, supra), however, we have illustrated the use of activated clay as the catalyst. These catalysts are not intended to constitute the only catalysts which can be utilized in connection with the present invention. Other metallic halide catalysts may also be employed in addition to aluminum chloride, such as zinc chloride, iron chloride, antimony chloride and tin chloride. These are effective in the order named, the most active of the group being zinc chloride, but aluminum chloride is even more efficient and is positioned at the head of this list. Aluminum chloride is preferred for another reason beyond its intrinsic efficiency, namely, because it is also a polymerization catalyst, and we have found it to be an advantage to employ the same catalyst for phenolation as for polymerization. The foregoing will be clearer when it is realized that the nature of the reaction by which phenol is introduced into the resin compound identifies it as being a Friedel-Crafts type of reaction. As is well known, these reactions take place readily in the presence of aromatic solvents and metallic halide catalysts.

Excluding any reference to activated clay, all the catalysts heretofore referred to are amphoteric. When exposed to moisture they hydrolyze, producing an acid condition. This can be taken advantage of in their removal from the reaction mixture, and thus after completion of polymerization the mixture is diluted with solvent to reduce both its specific gravity and its viscosity, whereupon it is poured into a 1–10% solution of hydrochloric acid in water. This hydrochloric acid solution has the effect of breaking up all the aluminum chloride complexes and, in effect, isolates the catalyst as an aqueous solution of such. The presence of the acid prevents emulsification and, therefore, upon standing, a two-layer separation occurs, the bottom layer of which contains the catalyst in solution and the top layer of which contains the resins and oils in solution. The top layer is separated and distilled. The use of a water solution of hydrochloric acid is also of significance in that the water serves to neutralize or "kill" the catalyst in such a manner that if, under the particular conditions involved, stratification is not complete, then only water contaminates the resin layer, resulting in no disadvantage or harm. Upon distillation of the upper layer as noted above, any trace of hydrochloric acid will necessarily be first driven off and any trace of the catalyst will be converted to aluminum hydroxide, which has no harmful effect on the resin other than the purely trival effect of there being a trace of mineral matter occluded in the resin as an ash.

As above indicated, the catalysts are not limited to metallic halides. Activated clays such as, and in particular, Attapulgus clay and Super Filtrol are each satisfactory and operative as a polymerizing and phenolating catalyst. It is not preferred in connection with the present invention, however, due to the fact that its use introduces a control difficulty, but when used it is removed merely by filtration, there being no necessity for settling the mixture as set forth above. The filtrate, of course, contains the resin in solution from which it is recovered by distillation. Sulphuric acid can also be employed as a phenolating catalyst. It likewise is not the preferred form of catalyst which, while it provides compatible resins, is apt to produce resins which are off-color and/or oxidized. This, we are convinced, results from the occurrence of side or secondary reactions. The acid can, however, be readily washed out with water. This catalyst is deemed to form a part of the present invention.

One mole of terpene resin weighs approximately 550–1000 grams and thus requires about 94 grams of phenol as a maximum if addition takes place at the double bond, as previously set forth by us. Actually, however, somewhat of an excess of phenol is preferable, and this excess can be removed during the final distillation. The resins are phenolated to the extent of about 50%, based upon calculations from Experiment No. 3, and this amount or extent of phenolation is amply sufficient to confer a useful degree of compatibility upon the resins. Below 50% of phenolation, compatibility may still be endowed upon resins, depending somewhat upon the nature thereof. We have discovered that at least in one instance phenolation to the extent of only approximately 8–10% produced compatibility. Therefore, in the matter of phenolation percentage below 50%, our invention covers all those percentages from approximately 8% upwards, which in any particular case confers a useful degree of compatibility. Above 50% phenolation the products are still further improved and, therefore, as to percentage of phenolation our invention includes all percentages up to the theoretically possible maximum.

Consideration must also be given to the amount of catalyst present. Since aluminum chloride is the preferred catalyst, this question will be discussed with relation to that material only, with the understanding that it applies proportionately for the other catalysts noted. The amount of aluminum chloride which is employed determines the amount of phenol that is caused to enter the resin chemically. Thus, there is a chemical and molar equivalence of the reacting materials, proof of which is evident from the fact that the entry of phenol is simultaneous with the evolution of HCl gas. For a resin molecular weight of approximately 550, about 133 grams of aluminum chloride are required. Accordingly, for the 200 grams of terpene used in Experiment No. 3 in which substantially all the terpene was converted to resin, the total of 75 grams of aluminum chloride employed constituted an excess of approximately 50%. While some excess is preferable or desirable, it is not requisite to use such a large excess, which, however, does no harm.

Satisfactory results are obtained when the aluminum chloride is added in small ingredients. When all the aluminum chloride has been added, a clear, bright, cherry-red solution is produced. During the latter half, approximately, of the catalyst additions, most of the evolved HCl gas is given off, and we are convinced that the chemical coupling or interaction of the phenol and the resin molecule occurs at such time. We have found that best results are produced by employing the following procedure: Place the required amount of phenol and AlCl₃ in a refluxing flask by themselves; warm gently whereupon solution occurs followed later on by separation of a white material which can, however, be long delayed by adding a solvent such as benzene or toluene after the phenol dissolves; in the interval add a separately prepared polymerized resin solution which results in only a mild reaction without the white precipitation; warm the combined solutions to produce phenolated resin in solution. Advantages of this procedure reside in shortening the refluxing period and in better control over the combining of the phenol-aluminum chloride complex with the terpene polymer, the reaction being of diminished violence with production of better color and higher melting point in the product. In addition, the depolymerizing or cracking ability of the AlCl₃ is suppressed.

The present invention has been particularly developed for the purpose of rendering terpene resins compatible with ethyl cellulose. Various alpha-pinene polymers have been phenolated in accordance with the present invention, as also have been a number of beta-pinene polymers. It is these beta-pinene polymers which are used in the special cuts referred to in some of the preceding experiments. Although this last point has not been established to a conclusive certainty, the boiling point and specific gravity of the special cut are so close to those recognized as being characteristic of beta-pinene as to lend credence to this supposition, which is believed to be established beyond reasonable doubt in view of the fact that no other known terpene has properties within this range.

Resinous terpene polymers having melting points within the range of approximately 65 to 125° C. have also been found to respond of phenolation in accordance with the foregoing. We have determined that pinene dimer also reacts with phenol, producing a compatible phenolated compound. The above mentioned terpenes in all their various stages of polymerization constitute by far the greater portion of polymers capable of being produced from American gum turpentine. Certain other terpenes such as dipentenes, limonenes, camphenes, etc. undergo analogous phenolation and are a part of the present invention, although the lack of availability of substantial amounts of the same at reasonable prices reduces the commercial importance thereof.

Some non-terpenic raw materials also undergo phenolation in the presence of aluminum chloride, and examples of the same will be understood from Experiments No. 7 and No. 8 which follow.

EXPERIMENT #7

| | | |
|---|---|---|
| Indene resin with a cube in Mercury M. P. of 152° C | grams | 50 |
| Phenol | do | 20 |
| Benzol | cc | 15 |
| AlCl₃ | grams | 10 | were carefully melted together, and simmered for 30 minutes.

The resin was recovered and was found to be compatible. Since no attempt was made to prevent depolymerization, the melting point was depressed to 129° C.

EXPERIMENT #8

Petroleum resin, which is a conglomerate mixture of olefine and diolefine polymers formed with aluminum chloride, also responds to the invention, and gives off copious fumes of HCl gas.

| | | |
|---|---|---|
| Petroleum resin | grams | 25 |
| Phenol | do | 10 |
| AlCl₃ | do | 10 |
| Petroleum benzine | cc | 10 |

Same technique of reacting as in #7. The resulting resin was compatible.

Variations in temperature during refluxing also have a definite effect upon the products produced. It is believed that this refluxing will be understood from the experiments, but in explanation thereof we here point out that this preferably takes place as a separate step following the addition of the catalyst to the solution of the resin or polymer in the solvent. When a high boiling solvent such as refined solvent naphtha with a boiling point of 150–180° C. is employed, the refluxing temperature required has some disadvantageous effect in causing a darkening of the products. At these temperatures also, the aluminum chloride has some cracking or depolymerizing effect, resulting in a depression of the melting point of the products. The use of a lower boiling point solvent such as xylol (boiling point 135–145° C.) produced a much paler product and the depression in melting point was relatively small. Toluol (boiling point 108–110° C.) also produces excellent results. We prefer, however, to employ benzol (80° C. boiling point) in the reaction mixture to moderate the temperature and to limit the maximum temperature. With benzol present, a rise in temperature appreciably above the boiling point thereof distills some of the benzol into the condenser employed as part of the apparatus and, subsequently returning cold to the reaction mixture, cools it several degrees. In this manner we are able to maintain the temperature of the reaction mixture below a predetermined maximum, depending, of course, upon the particular solvent used and the amount of it present. In any particular case, the nature and amount of this solvent are adjusted to prevent undesirable darkening of the products, undesirable depression in melting point and to limit other changes in condition or property.

By a further modification of the present invention we are able to produce phenolated resins of the palest or most colorless type or with predetermined, controlled or bleached appearance. In this form of the invention dried activated clay is employed subsequent to phenolation for bleaching or color control purposes. The procedure will be clear from the following:

EXPERIMENT #9

The standard polymerization was carried out. Then added 100 grams phenol and 25 grams AlCl₃ in increments. Refluxed for 3 hrs. then transferred to a beaker, added 125 grams of Super-Filtrol (an activated clay) and heated to about 110° C. to expel moisture. It became active as a bleaching agent, and when removed the resin was found to be paler than the average run.

> Resin yield was 269 grams.
> Melting point was 127° C.
> Color was about ⅛ to ¼
> Resin was compatible.

This experiment shows that an activated bleaching clay when dried serves to improve the color to a considerable extent.

The clay treatment in the preceding experiment was carried out as a single addition but this may also be effected in a plurality of stages with a second portion of clay being used at a higher temperature than the first portion, this procedure being especially beneficial as is apparent from the experiment set forth below:

EXPERIMENT #10

Standard polymerization was carried out. Added 100 grams phenol and 25 grams $AlCl_3$ in increments. Refluxed for 3 hrs.; washed out the catalyst with dilute HCl; treated the top layer with 150 grams of clay and dehydrated, and bleached. Removed this clay, added a fresh portion of 100 grams clay, dehydrated, and held in the dry state near 120° C. for about 30 minutes. This second portion of clay served to further bleach, and polymerize.

> Resin yield was 291 grams.
> Melting point was 128° C.
> Color was close to ⅛.
> Resin was compatible.

The use of the second portion of clay at a higher temperature caused some additional active polymerization as indicated by the higher yield and greater volume of clay, which could have trapped appreciable resin. The melting point was one degree higher.

We have further discovered that compatibilized (phenolated) resins can also be hydrogenated, the product of Experiment #9 being subjected to hydrogenation in a specimen run. The phenolated and hydrogenated resin in this instance was a very pale amber yellow only slightly more colored than a hydrogenated unphenolated terpene resin. The resin absorbed about 37 cc. of hydrogen per gram, demonstrating the existence of a residual unsaturation after phenolation and proving that phenol attaches to the resin chemically in a manner substantially like that involved in hydrogenating the resin. The essential data of the experiment follow:

EXPERIMENT #11

*Hydrogenation of a compatible resin*

| | | |
|---|---|---|
| Resin #9 | grams | 100 |
| CuCrO | do | 20 |
| Petroleum benzine | cc | 100 |

| Time | Temp. | Press. |
|---|---|---|
| 11:20 | 30 | 810 |
| 11:30 | 98 | 1000 |
| 11:40 | 125 | 1085 |
| 11:50 | 151 | 1140 |
| 12:00 | 170 | 1165 |
| 12:15 | 194 | 1260 |
| 12:30 | 209 | 1315 |
| 12:45 | 221 | 1370 |
| 1:15 | 219 | 1365 |
| 1:50 | 30 | 740 |

The present invention is not to be confused with phenol-terpene condensations such as are set forth in the patent to Hönel No. 2,123,898. Chemical and functional distinctions between the two are clearly apparent. In the patent a halogen derivative of terpene is reacted with a phenol to produce a terpene-phenol while splitting out hydrogen halide. Polymerized terpenes are neither involved nor disclosed; consequently the patent has no concern with phenolated terpene polymers nor with compatibilization of such polymers through phenolation.

Resins compatibilized in accordance with the foregoing possess new and useful properties. Referring, for example, to terpene resins, these when compatibilized are not only soluble in all kinds of hydrocarbon solvents but are even soluble in alcohols to some extent, this latter property depending upon the amount of tar acid introduced and the molecular weight of the resin. Compatibilized terpene resins are soluble in ethers and chlorinated solvents; they are practically non-yellowing; and when used in the cooking of oils to make varnishes they have the unique property of retarding the gelling or setting up of the bodied oils. Phenolated resins eliminate the frosting and crystallizing of China-wood oil commonly known as "gas-checking." When used in making up enamels, paints or varnishes, these phenolated resins reduce drying in the cans and surface "skinning," these being commonly encountered under existing conditions.

Before introduction of tar acids into their structure, terpene resins have little use in conjunction with lacquer type film materials, e. g., cellulose derivatives. Phenolated terpene resins, however, are highly useful with ethyl cellulose, cellulose acetate and other cellulosic derivatives. Very clear films can, for example, be made using only phenolated resin and ethyl cellulose. While such a film is characterized by a certain brittleness, a tough flexible film capable of repeated bending without cracking or breaking can be produced by the addition of a small percentage of a heavy liquid plasticizer such as castor oil, high boiling esters and hydrogenated indene dimer.

Pliable films of the nature just described can be cut into narrow strips having extreme thinness and in such form are useful as transparent wrapping for wire insulation, this being especially suitable for radio wiring. The chemical and electrical characteristics of these films make them ideal in all radio transmitting and receiving installations. In the form of sheets, it may be used as a substitute for "Cellophane." When properly fabricated, these films are also adaptable to be formed into ribbons of the kind and size employed for motion picture film negatives.

Other valuable uses for phenolated resins will also be appreciated by those skilled in this art. Examples of such are as adhesives; as modifiers of phenolic resins of the Bakelite type; and in connection with paper coatings, hot melt compositions wherein ethyl cellulose is employed; and raw material for further reaction with aldehydes such as formaldehyde.

Phenolated terpene resins are of wide applicability in the impregnation of paper and cloth, in the preparation of wax stencils and in such other uses as the joining of furs to a cloth backing material. For hot melt use, a mixture substantially as follows is of utility:

| | | Percent |
|---|---|---|
| Ethyl cellulose | approximately | 20–25 |
| Resin | do | 60 |
| Plasticizer | do | 10 |
| Vegetable wax | do | 5 |
| Paraffin wax | do | 5 |

This mixture is utilized in the molten state and may be best applied by means of a knife or a squeeze roll. Other uses will be appreciated wherein advantage is taken of the new property of compatibility with cellulose derivatives as well as those instances where the toleration of smaller amounts of other modifying materials for blending purposes occurs.

Other phenolated resins such as phenolated coumarone-indene and phenolated petroleum resins have the same general or analogous properties as outlined above for phenolated terpene resins. Such, as previously indicated, are deemed to form a definite modification of the present invention.

The above is presented as illustrative and not as limitative. The invention is rather defined by the subjoined claims which, so far as their terms permit, are intended to cover modifications, substitutions, additions and omissions beyond those hereinabove set forth.

Having thus described our invention, what we claim as new and desire to secure by Letters Patent is:

1. The herein described method of making a high melting primarily terpenic hydrocarbon resin compatible with ethyl cellulose by heating a reaction mixture consisting in substantial entirety of a solution of preformed relatively high melting wholly hydrocarbon pinene polymers in an inert solvent therefor and phenol in the presence of a Friedel-Crafts metallic halide catalyst.

2. The herein described method of making a high melting primarily terpenic hydrocarbon resin compatible with ethyl cellulose by heating a reaction mixture consisting in substantial entirety of a solution of preformed relatively high melting wholly hydrocarbon pinene polymers in an inert solvent therefor and phenol in the presence of aluminium chloride.

WILLIAM H. CARMODY.
HAROLD E. KELLY.